United States Patent [19]

Schmeidl et al.

[11] B 3,923,889

[45] Dec. 2, 1975

[54] ALCOHOL-SOLUBLE ETHYL AURAMINE SALTS

[75] Inventors: Karl Schmeidl, Frankenthal; Manfred Eisert, Ludwigshafen; Guenther Riefel, Heidelberg, all of Germany

[73] Assignee: Badische Anilin- & Soda-Fabrik Aktiengesellschaft, Ludwigshafen (Rhine), Germany

[22] Filed: Jan. 8, 1973

[21] Appl. No.: 321,938

[44] Published under the Trial Voluntary Protest Program on January 28, 1975 as document no. B 321,938.

[30] Foreign Application Priority Data

Mar. 22, 1972 Germany............................ 2213848
Jan. 11, 1972 Germany............................ 2201162
Feb. 18, 1972 Germany............................ 2207609

[52] U.S. Cl................................. 260/566 R; 106/22
[51] Int. Cl.²........................................ C07C 119/00
[58] Field of Search................................ 260/566 R

[56] References Cited

UNITED STATES PATENTS

| | | | |
|---|---|---|---|
| 3,132,178 | 5/1964 | Weyker et al.................. | 260/566 R |
| 3,314,994 | 4/1967 | Schubert et al................ | 260/566 R |

FOREIGN PATENTS OR APPLICATIONS

| | | | |
|---|---|---|---|
| 815,966 | 7/1959 | United Kingdom............ | 260/566 R |
| 1,185,948 | 3/1970 | United Kingdom............ | 260/566 R |

OTHER PUBLICATIONS

Lynch et al., J.A.C.S., Vol. 55, pp. 2515–2520, (1933).

Dictionary of Organic Compounds, Vol. 1, p. 292, (1965).

*Primary Examiner*—Schwartz Gerald A.
*Attorney, Agent, or Firm*—Johnston, Keil, Thompson & Shurtleff

[57] ABSTRACT

Ethyl auramine salts, in particular ethyl auramine thiocyanate, having high solubility in alcohols and water containing alcohols. The salts are very suitable for use in flexographic inks.

1 Claim, No Drawings

ALCOHOL-SOLUBLE ETHYL AURAMINE SALTS

The invention relates to compounds of the formula:

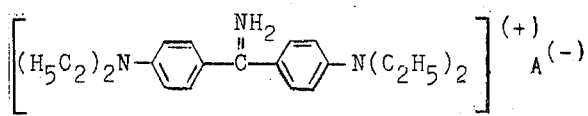

in which $A^{(-)}$ is one of the anions: $Br^{(-)}$, $I^{(-)}$, $OCN^{(-)}$, $SCN^{(-)}$, $NO_2^{(-)}$ and $NO_3^{(-)}$.

The new compounds may be easily prepared by double decomposition of water-soluble auramine salts, for example from the corresponding ethyl auramine chloride, acetate or sulfate, with water-soluble salts of the appropriate acids.

Particularly suitable water-soluble salts are alkali metal and ammonium salts, for example the ammonium, sodium or potassium salts of hydrobromic or hydroiodic acid, the corresponding cyanates and thiocyanates and also nitrites and nitrates.

In the production of the salts by double decomposition a convenient procedure is to dissolve the water-soluble auramine salt at about 60° to 70°C in the necessary amount of water, filter the solution if necessary and then add the amount of a water-soluble salt containing one of the said anions which is required for the completest possible precipitation of the auramine.

The bromide, iodide, thiocyanate and nitrate are also readily accessible from ethyl auramine base (preferably dissolved in an organic medium, for example a hydrocarbon such as benzene or a halo-hydrocarbon such as trichloroethylene) by reaction with preferably the equivalent amount of the appropriate acid. The salts are thus obtained devoid of extraneous salts and therefore in a form which has excellent solubility in alcohol.

It is surprising that in the reaction of the base with the acids a satisfactory product is obtained in spite of the great sensitivity of auramines to hydrolysis.

The new auramine salts are distinguished by excellent solubility in alcohols and in mixtures of alcohols and water which contain up to about 30% of water.

As compared with salts of methyl auramine, some of which are known, the solubility is higher to an unforseeable extent.

The properties of the new ethyl auramine salts make them eminently suitable for use in flexographic inks in which a high solubility in alcohol and mixtures of alcohol and water is necessary. Ethyl auramine nitrite, the bromide and iodide and particularly the thiocyanate have the further unexpected advantage that prints prepared with them have very good fastness to water so that the conventional use of laking agents can be dispensed with.

Ethyl auramine thiocyanate is preferred because of its outstanding solubility and other properties.

The following Examples illustrate the invention. Parts and percentages, unless otherwise stated, are by weight.

EXAMPLE 1

36 parts of ethyl auramine chloride (C.I. Basic Yellow 37, 41,001) is dissolved in 2000 parts of water at 60°C. The solution is filtered and the filtrate has 30 parts of sodium nitrate added to it with stirring. The whole is then allowed to cool, suction filtered and the residue dried. 35.4 parts of ethyl auramine nitrate is obtained.

EXAMPLE 2

The procedure described in Example 1 is followed but 50 parts of sodium nitrite is used instead of sodium nitrate. 33.6 parts of ethyl auramine nitrite is obtained.

EXAMPLE 3

A solution of 16.2 parts of ethly auramine base (bis-diethylaminobenzophenonimine) in 140 parts of trichloroethylene has 105 parts of a 3% nitric acid added to it at room temperature with intense stirring. Stirring is continued for another 10 minutes followed by suction filtration and drying. The yield is 17.8 parts of ethyl auramine nitrate.

EXAMPLE 4

35 parts of a 9% nitric acid is added at room temperature with intense stirring to a solution of 16.2 parts of ethyl auramine base in 120 parts of benzene. Stirring is continued for another 10 minutes followed by suction filtration and drying. The yield is 18.2 parts of ethyl auramine nitrate.

EXAMPLE 5

36 parts of ethyl auramine (C.I. Basic Yellow 37, 41,001) is dissolved in 2000 parts of water at 60°C and the solution is filtered. 25 parts of sodium thiocyanate is added to the filtrate while stirring and the whole is then allowed to cool and filtered. The residue is washed with a little water and dried. The yield is 36.2 parts of ethyl auramine thiocyanate.

EXAMPLE 6

The procedure of Example 5 is adopted but 36 parts of sodium cyanate is used instead of sodium thiocyanate. The yield is 34 parts of ethyl auramine cyanate.

EXAMPLE 7

A solution of 5.9 parts of thiocyanic acid in 150 parts of water is added to a solution of 32.3 parts of bisdiethylaminobenzophenonimine in 250 parts of benzene at room temperature while stirring vigorously. A precipitate is obtained which is suction filtered and dried. The yield is 34.8 parts of ethyl auramine thiocyanate.

EXAMPLE 8

36 parts of ethyl auramine (bisdiethylaminobenzophenonimine hydrochloride) is dissolved in 2000 parts of water at 70°C. The solution is filtered and the filtrate has 50 parts of sodium bromide added to it. The mixture is allowed to cool and suction filtered, and the residue washed with a little water and dried. 36.9 parts of ethyl auramine bromide is obtained having a melting point of 256° to 260°C.

EXAMPLE 9

The procedure described in Example 8 is followed but 60 parts of sodium iodide is used instead of sodium bromide. 41 parts of ethyl auramine iodide having a melting point of 230° to 234°C is obtained.

EXAMPLE 10

3% aqueous hydrobromic acid is added to a solution of 16.2 parts of bisdiethylaminobenzophenonimine in 120 parts of benzene at room temperature with vigorous stirring until a pH of 5 is achieved in the reaction mixture. Stirring is continued for another 5 minutes followed by suction filtration and drying. 17.6 parts of ethyl auramine bromide is obtained.

EXAMPLE 11

A flexographic ink is prepared by dissolving 5 parts of ethyl auramine thiocyanate from Example 5 or 7 in 95 parts of a 23% shellac solution in a mixture of ethanol and ethyl glycol in a ratio of 9:1 by weight. The fastness to water of offset prints prepared with this ink is 4 to 5 according to DIN 16,524.

EXAMPLE 12

(Comparative Example)

The procedure of Example 11 is used but 5 parts of auramine nitrate is used instead of ethyl auramine thiocyanate. A flexographic ink is obtained whose fastness to water is determined as 1 to 2. The fastness to water is thus clearly inferior to that of the printing ink prepared according to Example 11.

We claim:
1. The dye of the formula:

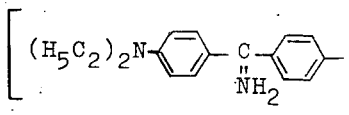

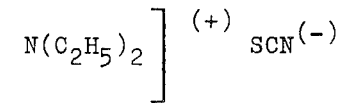

* * * * *